No. 805,674. PATENTED NOV. 28, 1905.
M. L. SENDERLING.
COUPLING.
APPLICATION FILED JUNE 30, 1904.

Witnesses:
F. George Barry,
Henry Thieme

Inventor:
Martin L. Senderling
by attorneys

UNITED STATES PATENT OFFICE.

MARTIN L. SENDERLING, OF JERSEY CITY, NEW JERSEY.

COUPLING.

No. 805,674.        Specification of Letters Patent.        Patented Nov. 28, 1905.

Application filed June 30, 1904. Serial No. 214,697.

*To all whom it may concern:*

Be it known that I, MARTIN L. SENDERLING, a citizen of the United States, and a resident of Jersey City, in the county of Hudson and State of New Jersey, have invented a new and useful Improvement in Couplings, of which the following is a specification.

The object of my invention is to provide a coupling in which the members may be very quickly and easily locked and released and in which means are provided for holding the members in their locked position against unintentional release.

A further object is to provide certain improvements in the construction, form, and arrangement of the several parts whereby the retainer works automatically to hold the members interlocked and is operated manually to permit the members to be released.

Figure 1:
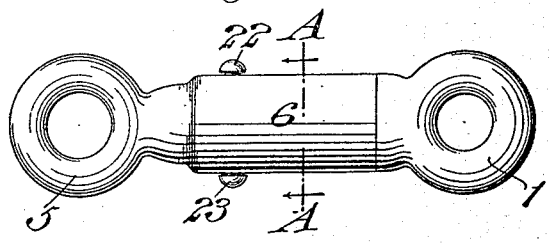
Figure 2:
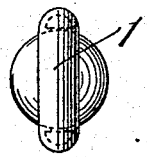
Figure 3:
Figure 4:
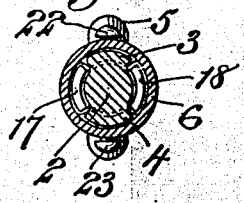
Figure 5:
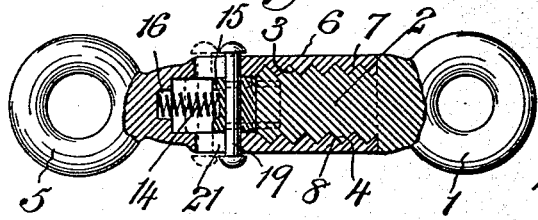
Figure 6:
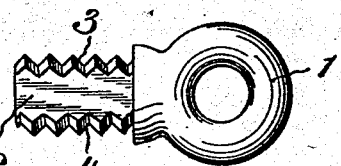
Figure 7:
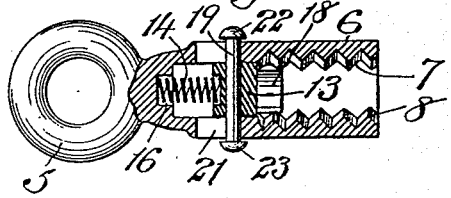
Figure 8:
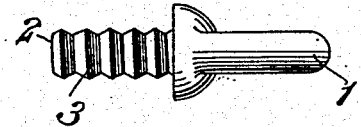
Figure 9:
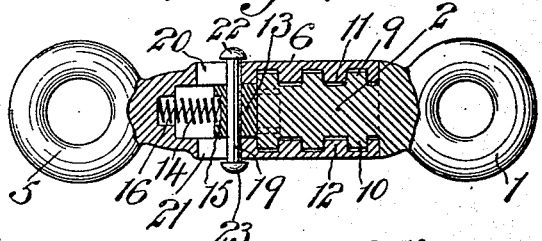
Figure 10:
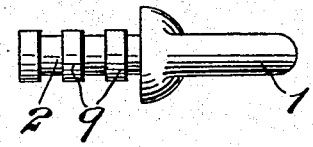
Figure 11:
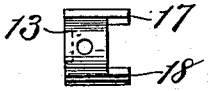

In the accompanying drawings, Figure 1 represents the coupling in side elevation. Fig. 2 is an end view of the same. Fig. 3 is a top plan view of the coupling. Fig. 4 is a transverse section taken in the plane of the line A A of Fig. 1. Fig. 5 is a longitudinal central section through the coupling. Fig. 6 is a detail view, in side elevation, of the bolt member. Fig. 7 is a longitudinal central section through the socket member. Fig. 8 is a top plan view of the bolt member. Fig. 9 is a longitudinal central section through the coupling, showing a modified form of shouldered connection between the members. Fig. 10 is a top plan view of the bolt member of this form; and Fig. 11 is a detail view, in top plan, of the retainer which holds the members in their interlocked position.

The bolt member of the coupling is herein shown as comprising an eye or head 1, from which extends a shank 2. In the form shown in Figs. 1 to 8, inclusive, the shank 2 is provided with a mutilated screw, the mutilated screw being divided into two screw-threaded portions 3 and 4. The socket member comprises an eye or head 5, from which extends a hollow barrel 6, the bore of which is provided with a mutilated screw. In the present instance the mutilated screw is divided into two screw-threaded portions 7 and 8. The arrangement of the mutilated screws on the bolt member and in the socket member is such that the bolt may be inserted longitudinally into the bore of the barrel 6 with the screw-threaded portions 3 and 4 in the spaces between the screw-threaded portions 7 and 8. The bolt member may then be rotated laterally with respect to the socket member, thus causing the screw-threaded portions 3 and 4 to be engaged with the screw-threaded portions 7 and 8. Because of the pitch of the screw the two members will be drawn into snug engagement with each other by this lateral movement.

In Figs. 9 and 10 I have shown the shouldered connection between the bolt and socket members as follows: The shank 2 of the bolt member is provided with a plurality of oppositely-arranged square shoulders 9 and 10, and the bore of the barrel 6 is provided with similarly oppositely arranged square shoulders 11 and 12.

The coupling may be used wherever it is desired to couple two parts together—as, for instance, the coupling may be used in connection with harness. The eye or head 1 of the bolt member of the coupling may be utilized for the attachment of one part of the harness, and the eye or head 5 of the socket member may be utilized for the attachment of another part of the harness.

I provide a retainer for holding the members in their locked position as follows: A spring-actuated plunger 13 is located within the bore of the barrel 6. A spring 14 is interposed between the plunger 13 and the inner end of the bore. In the present instance I provide seats 15 16 in the plunger and barrel, respectively, for confining the spring. This plunger 13 is provided with two lugs 17 18, which are fitted to slide in the bore between the mutilated shouldered connections. The outward movement of the plunger 13 under the influence of the spring is limited by a cross-rod 19, which extends through the plunger and also through elongated slots 20 21 in the walls of the barrel 6. The ends of the rod 19, which extend exteriorly to the barrel 6, may be provided with suitable knobs 22 23 for ease in manipulating the plunger.

In operation as the shank of the bolt member is inserted into the barrel of the socket member the end of the shank will engage the lugs 17 18, thus forcing the plunger inwardly against the tension of the spring 14. As the bolt member is turned laterally to cause it to interlock with the socket member the lugs 17 18 of the plunger will slide past the end of the shank of the bolt member, and thus hold the members in interlocked position. When it is desired to release the members, the plunger is manually withdrawn, when the bolt member may be turned into position to permit it to be withdrawn from the socket member.

While I have shown and described the bolt and socket members as being provided with eyes, it is to be understood that they need not be provided with such eyes and that they may be made of various shapes and forms, the gist of the invention lying in the means for connecting and disconnecting the two members.

What I claim as my invention is—

1. A coupling comprising bolt and socket members, arranged to be locked by a longitudinal movement of the members toward each other and a rotary movement with respect to each other, a spring-actuated retainer movable relatively to the bolt and socket members and arranged to be forced back longitudinally to permit the engagement of the bolt and socket members and to automatically spring forward when the members are imparted a rotary movement with respect to each other and means carried by the retainer arranged to interlock with the bolt member to lock the bolt and socket members together.

2. A coupling comprising a socket member having a mutilated shouldered bore, a spring-actuated retainer located within the bore and a bolt member having a mutilated shouldered shank, the said retainer being arranged to be forced back by the shank as it is inserted into the bore and to automatically spring forward when they are turned laterally with respect to each other and means carried by the retainer arranged to interlock with the bolt member to lock the bolt and socket member together.

3. A coupling comprising a socket memb having a mutilated screw-threaded bore, spring-actuated retainer located within t bore and a bolt member having a mutilate screw-threaded shank, the said retainer being arranged to be forced back by the shank as it is inserted into the bore and to automatically spring forward when they are turned laterally with respect to each other and means carried by the retainer arranged to interlock with the bolt member to lock the bolt and socket members together.

4. A coupling comprising a socket member having a mutilated shouldered bore, a spring-actuated retainer located within the bore, a bolt member having a mutilated shouldered shank, the said retainer being arranged to be forced back by the shank as it is inserted into the bore and to automatically spring forward when the members are turned laterally with respect to each other, means carried by the retainer arranged to interlock with the bolt member to lock the bolt and socket members together, and means for manually operating the retainer to permit the members to be released from each other.

In testimony that I claim the foregoing as my invention I have signed my name, in presence of two witnesses, this 28th day of June, 1904.

MARTIN L. SENDERLING.

Witnesses:
 FRED'K HAYNES,
 ALIDA M. EGBERT.